July 17, 1951     A. B. F. G. RICHARDSON ET AL     2,560,778
EXTRUSION APPARATUS FOR COVERING CORES
Filed Feb. 28, 1950     2 Sheets-Sheet 1
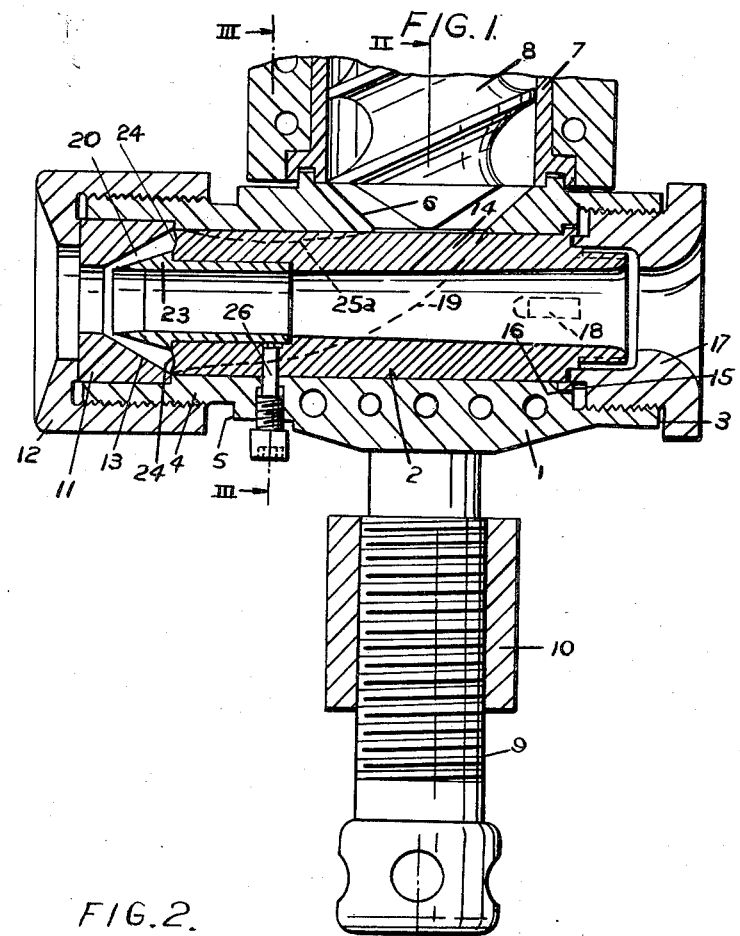
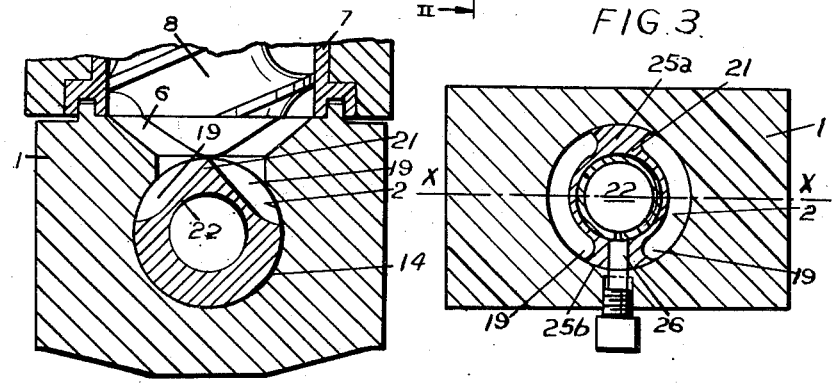
Inventors
A. B. F. G. Richardson
E. Tunnicliff &
I. K. Fisher
Hoopes Leonard & Glenn
Attorneys July 17, 1951 A. B. F. G. RICHARDSON ET AL 2,560,778
EXTRUSION APPARATUS FOR COVERING CORES
Filed Feb. 28, 1950 2 Sheets-Sheet 2
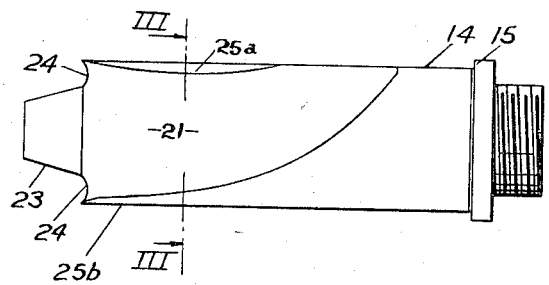
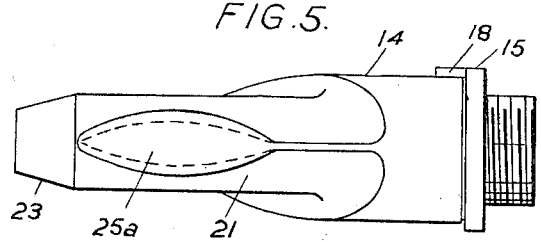
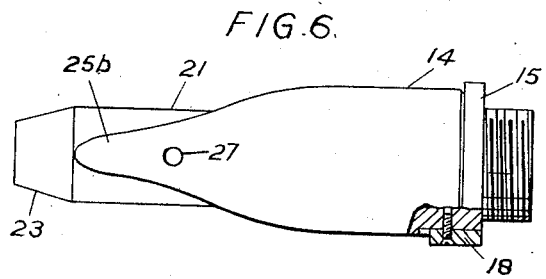
Inventors
A. B. F. G. Richardson
E. Tunnicliff &
I. K. Fisher
Attorneys

UNITED STATES PATENT OFFICE 2,560,778

EXTRUSION APPARATUS FOR COVERING CORES

Arthur Bruce Fraser Gillespie Richardson, Eustace Tunnicliff, and Ivan Kenneth Fisher, Leigh, England, assignors to British Insulated Callender's Cables Limited, London, England, a British company Application February 28, 1950, Serial No. 146,862
In Great Britain March 23, 1949

6 Claims. (Cl. 18—13)

This invention relates to machines for the extrusion of extrudable masses, such as natural rubber mixes, synthetic rubber mixes and synthetic thermo-plastics (all hereinafter for convenience referred to as "stock") to form a tube or to form a covering or sheath for a core. Such machines comprise a cylinder, generally called a barrel, in which works a piston or, as is more usual, a rotatably driven feed screw, for propelling stock fed into one end of the barrel along the barrel and thence into an extrusion head at the other end of the barrel. From this head the stock is expelled through a female die or matrix either to form a covering on a core as the core is caused to travel forward through the die aperture or to form tubing. In the former case the core is led through the head to the die through a member which serves to centralize or otherwise position the core in the die aperture. In the latter case the member forms or positions a mandrel between which and the wall of the die the stock is extruded as a tube. This member, whether or not it is longitudinally apertured for the passage of a core, will hereinafter be referred to as a core tube.

In particular the invention is concerned with extrusion machines of the kind in which the head is secured to the barrel with the axis of the head lying transverse, generally at right angles, to the axis of the barrel. Such heads are known which comprise a body member or block having a through bore and a lateral opening leading from the delivery opening at the front end of the barrel to the through bore in one end of which bore fits a core tube which is usually centrally apertured to serve to guide a core towards a matrix which is housed in the other end of the bore. Between the lateral opening in the body member or block and that end of the core tube that lies nearer the matrix, hereinafter termed the "front" end, the core tube is of reduced cross-section to provide between it and the wall of the through bore two passages of more or less segmental cross-section, one on each side of a central web, which lead the stock from the lateral opening to a forming chamber between the front end of the core tube and the matrix, gradually changing its general direction of flow as the front ends of the passages are approached. Heads of this kind, which are sometimes known as, and will hereinafter be termed, self-centering heads, are of small capacity and so stock dwells for only a short time in them as compared with the time in which it dwells in heads having a core tube of substantially less diameter than the internal diameter of the head, the volumetric rate of extrusion being the same. Consequently, the risk of overheating of the stock in the head is reduced.

However, difficulties are sometimes experienced even with self-centering heads both as regards the obtaining of tubing and coverings of uniform wall thickness and, where the extruded stock is a heat-curable composition such as a natural rubber mix, in the production of tubing and coverings without occasional interruption due to clogging of the die with lumps of stock dislodged from static pockets of stock which have become prematurely vulcanised. It is an object of our invention to provide an improved form of head in which these difficulties are reduced or eliminated.

In accordance with our invention we provide a self-centering head in which the central web of the core tube extends beyond the front edge of the lateral opening in the wall of the head by a distance of about one half the diameter of the opening, or more, and in which at the front end of the central web the two flow passages separated by the web are, in cross-section, symmetrical about a plane which contains the extrusion axis and is normal to the central plane of the web. The term "front edge" is used to indicate the edge that is nearest the delivery end of the head.

By using a core tube of which the central web extends well beyond the front edge of the lateral opening the effect of the disparity between the maximum and minimum lengths of the flow path between the lateral opening and the forming chamber is considerably reduced as compared with that in existing forms of self-centering heads, the central webs of the core tubes of which terminate at or near the front edge of the lateral opening. This, in conjunction with the symmetrical form of the passages at the entrance to the forming of chamber, tends to ensure uniformity of delivery around the entire circumference of the die.

In accordance with a further feature of our invention the cross-sectional area of the path for flow of stock through the head is gradually reduced, from a maximum at the inlet end of the lateral opening to a minimum near the front end of the core tube, as the extrusion orifice is approached. This may be done by making the lateral opening of conical form and each of the two passages formed between the web of the core tube and the wall of the through bore in the head, of gradually diminishing cross-section by appropriately varying the thickness of the web. We have found that in this way we obtain a scouring action which assists in the prevention of static pockets of stock in the head. With the object of avoiding a static pocket in front of the feed screw, the central part of the end face of the feed screw may be provided with a nose which enters the conical lateral opening in the head.

To enable the invention to be more fully understood and readily put into practice a preferred form of self-centering head constructed in accordance with the invention will now be described by way of example with the help of the accompanying drawings, wherein Figure 1 is a sectional view of the head mounted on the front end of the barrel of a rubber extrusion machine, Figures 2 and 3 are fragmentary cross-sections of the head, taken respectively, on the lines II—II and III—III of Figure 1, Figure 4 is a side elevation and Figures 5 and 6 are, respectively, a plan and an inverted plan, of the core tube fitted with a nose-piece.

Referring now to the drawings it is explained that the head comprises a block 1 having a bore 2 extending from its rear face 3 to and through a cylindrical projection 4 on its opposite face 5 and a lateral opening 6 leading from the delivery end of the cylinder 7 in which the feed screw 8 works to the interior of the bore 2. This block, which is substantially of rectangular form, is detachably secured in place by a single screw clamping device 9, 10.

At its front end the bore 2 is enlarged to receive a matrix 11 which is held in place by a retaining nut 12 which screws on the externally screw threaded wall of the projection 4. The inside face of the matrix includes a conical surface 13 leading to the throat of the die and forming the front end wall of the interior of the head. The rear end wall of the interior of the head is formed by a core tube 14 which fits the cylindrical bore 2 and at its rear end has a collar 15 which is received in an enlarged part of the bore 2. This collar is held against the step 16 by a retaining nut 17 which screws into a still further enlarged part of the bore, thus positively locating the core tube in the head in an axial direction. It is located angularly by means of a key 18 which enters a key-way in the wall of the bore 2.

Between the rear inner edge of the lateral opening 6 in the wall of the bore 2 and its front end, the core tube is of reduced section to provide between it and the wall of the bore 2 a pair of passages 19 leading from the lateral opening to a forming chamber 20 between the front end of the core tube and the conical rear face of the matrix, one passage on each side of a central web 21 through which extends a central passage 22 for the core to be covered. We prefer the web 21 to extend beyond the lateral opening 6 in the head by a distance of from one and one half times to twice the diameter of the opening and, as shown in Figure 1, to extend to the rear edge of the conically shaped front wall 13 of the forming chamber 20. We also prefer to fit an apertured detachable conical nose-piece 23 to provide support for the core almost up to its entrance into the throat of the matrix 11. On opposite sides of this nose-piece 23 the web 21 is tapered off to form blunt knife edges 24.

The shapes of the core tube 14 and the passages 19 are shown more clearly in Figures 2 to 6 and from Figure 3 it will be seen that at the front end of the central web 21 the two passages 19 are, in cross-section, symmetrical about the plane x—x which contains the axis of extrusion and is normal to the central plane of the web.

As will be seen from Figure 3, the bearing surfaces 25a and 25b of the central web which fit the wall of the through bore 2 are made wider than the thickness of the parts of the web between them and the apertured central portion of the web, and the corners between the bearing parts and the side faces of the web are rounded to eliminate the "tips" from the segmental or crescent-shaped flow passages 19 between the web and the wall of the through bore. This further reduces the risk of static pockets of stock being produced in these flow passages. We also make the arcuate length of the bearing surface 25a of that edge of the central web 21 that lies on the same side of the extrusion axis as the lateral opening 6 gradually increase from a point near the lateral opening to a maximum about midway between the lateral opening and the front end of the web 21 and then gradually decrease to a minimum as the front end is approached, preferably so that the bearing surface is approximately elliptical, as shown in Figure 5. The neighboring part of the web is correspondingly increased in thickness. This shaping of the web has two advantages. It stiffens the web in a direction normal to its central plane and reduces any tendency the core tube 14 may have when worn to rock in the head 1 in a direction normal to the central plane of the web. Secondly, as it increases the minimum length of each flow passage 19 without changing the maximum length, it makes for greater uniformity of thickness of the extruded covering. Additional lateral stiffness may be given to the core tube by passing a pin 26 through the wall of the head and into a recess 27 in the front end of the central web of the core tube. The recess may open into the bore of the core tube and the pin may serve to retain the nose-piece 23 in the core tube, as shown in Figure 1.

The nature of the gradual reduction in cross-sectional area of the path for flow of stock through the head, which we prefer to provide, will be given by the following figures for a particular machine having a 3¼" diameter feed screw:

| | Sq. in. |
|---|---|
| Area of flow path at inlet end of lateral opening | 3.07 |
| Area of flow path at outlet end of lateral opening | 2.4 |
| Area of flow path at point of minimum section (on line III—III of Figure 4) | 1.6 |

Beyond this point there is, naturally, an increase in cross-section and at the rear end of the forming chamber the cross-sectional area is 2.34 sq. in.

What we claim as our invention is:

1. A self-centering head for a machine for the extrusion of stock, comprising a bored body member having a lateral opening for the feeding of stock to the bore of said body member, a matrix positioned at an open end of said bore, a core tube positioned in said bore and comprising a rear portion which fits the wall of said bore and a front portion extending across said lateral opening and forward in the direction of said matrix beyond said lateral opening by a distance equal to at least one half the diameter of said lateral opening, said front portion being of reduced cross section compared with said rear portion to form a central web separating a pair of flow passages formed, one on each side of the central web, between the core tube and the wall of the bore, for leading stock from said lateral opening to a forming chamber between said matrix and the front end of said core tube, said flow passages each having at the front end of said central web a cross sectional shape that is symmetrical about a plane which contains the extrusion axis of said head and is normal to the central plane of said web.

2. A self-centering head for a machine for the extrusion of stock, comprising a bored body member having a lateral opening for the feeding of stock to the bore of said body member, a matrix positioned at an open end of said bore, a core tube positioned in said bore and comprising a rear portion which fits the wall of said bore and a front portion extending across said lateral opening and forward in the direction of said matrix beyond said lateral opening by a distance of from one and one half times to twice the diameter of said lateral opening, said front portion being of reduced cross section compared with said rear portion to form a central web separating a pair of flow passages formed, one on each side of the central web, between the core tube and the wall of the bore, for leading stock from said lateral opening to a forming chamber between said matrix and the front end of said core tube, said flow passages each having at the front end of said central web a cross sectional shape that is symmetrical about a plane which contains the extrusion axis of said head and is normal to the central plane of said web.

3. A self-centering head for a machine for the extrusion of stock, comprising a bored body member having a lateral opening for the feeding of stock to the bore of said body member, a matrix positioned at an open end of said bore, a core tube positioned in said bore and comprising a rear portion which fits the wall of said bore and a front portion extending across said lateral opening and forward in the direction of said matrix beyond said lateral opening by a distance equal to at least one half the diameter of said lateral opening, said front portion being of reduced cross section compared with said rear portion to form a central web separating a pair of flow passages formed, one on each side of the central web, between the core tube and the wall of the bore, for leading stock from said lateral opening to a forming chamber between said matrix and the front end of said core tube, said flow passages each having at the front end of said central web a cross sectional shape that is symmetrical about a plane which contains the extrusion axis of said head and is normal to the central plane of said web, the cross sectional area of the path for flow of stock through the head being gradually reduced, from a maximum at the inlet end of said lateral opening to a minimum near the front end of said core tube.

4. A self-centering head for a machine for the extrusion of stock, comprising a bored body member having a lateral opening for the feeding of stock to the bore of said body member, a matrix positioned at an open end of said bore, a core tube positioned in said bore and comprising a rear portion which fits the wall of said bore and a front portion extending across said lateral opening and forward in the direction of said matrix beyond said lateral opening by a distance equal to at least one half the diameter of said lateral opening, said front portion being of reduced cross section compared with said rear portion to form a central web separating a pair of flow passages formed, one on each side of the central web, between the core tube and the wall of the bore, for leading stock from said lateral opening to a forming chamber between said matrix and the front end of said core tube, said flow passages each having at the front end of said central web a cross sectional shape that is symmetrical about a plane which contains the extrusion axis of said head and is normal to the central plane of said web and said central web having bearing parts fitting the wall of said bore that are wider than the thickness of the parts of said web between them and a central portion of said web and having rounded corners between said bearing parts and the adjoining parts of said web.

5. A self-centering head for a machine for the extrusion of stock, comprising a bored body member having a lateral opening for the feeding of stock to the bore of said body member, a matrix positioned at an open end of said bore, a core tube positioned in said bore and comprising a rear portion which fits the wall of said bore and a front portion extending across said lateral opening and forward in the direction of said matrix beyond said lateral opening by a distance equal to at least one half the diameter of said lateral opening, said front portion being of reduced cross section compared with said rear portion to form a central web separating a pair of flow passages formed, one on each side of the central web, between the core tube and the wall of the bore, for leading stock from said lateral opening to a forming chamber between said matrix and the front end of said core tube, said flow passages each having at the front end of said central web a cross sectional shape that is symmetrical about a plane which contains the extrusion axis of said head and is normal to the central plane of said web and said central web having on that one of its edges that lies on the same side of the core tube as the inlet ends of said flow passages, a bearing surface which fits the wall of said bore and has an arcuate length that gradually increases from a point near said lateral opening to a maximum about mid-way between said lateral opening and the front end of said web and then gradually decreases to a minimum as the front end of said web is approached.

6. A self-centering head as specified in claim 5, wherein the part of said central web that is near the part of the said bearing surface that is of maximum arcuate length is correspondingly increased in thickness.

ARTHUR BRUCE FRASER.
GILLESPIE RICHARDSON.
EUSTACE TUNNICLIFF.
IVAN KENNETH FISHER.

REFERENCES CITED

The following references are of record in the file of this patent:

UNITED STATES PATENTS

| Number | Name | Date |
| --- | --- | --- |
| 441,808 | Royle et al. | Dec. 2, 1890 |
| 1,862,005 | Cherry et al. | June 7, 1932 |
| 2,436,869 | Lester | Mar. 2, 1948 |